2,854,493

PRODUCTION OF TETRAALKYLBENZENES

Lloyd C. Fetterly, Oakland, Kenneth F. Koetitz, Concord, and Donald W. Penhale, Berkeley, Calif., assignors to Shell Development Company, New York, N. Y., a corporation of Delaware No Drawing. Application March 20, 1956
Serial No. 572,616

7 Claims. (Cl. 260—668)

This invention relates to a method for producing 5-alkyl-1,2,4-trimethylbenzenes wherein the alkyl group contains from two to four carbon atoms.

It is an object of the present invention to provide a process for the production of 5-alkyl-1,2,4-trimethylbenzenes wherein the alkyl group contains from two to four carbon atoms, i. e., a 5-$C_{2\text{ to }4}$-alkyl-1,2,4-trimethylbenzene. It is a further object of the invention to convert xylenes into such 5-alkyl-1,2,4-trimethylbenzenes. It is a further specific object to provide a method for the production of 5-ethyl-1,2,4-trimethylbenzene.

Briefly the process of the present invention consists in reacting a xylene with an alkanal of from two to four carbon atoms in the presence of a liquid acid catalyst, hydrocracking at least the resulting diarylalkane to recover corresponding alkyldimethylbenzenes, reacting the latter compounds with formaldehyde in the presence of an acidic catalyst, hydrocracking at least the resulting diarylmethanes and recovering from the product the desired 5-alkyl-1,2,4-trimethylbenzene.

The hydrocarbon feedstock to be converted in the present process may be meta-xylene, para-xylene or ortho-xylene in relatively pure form or it may be a mixture of two or more of these xylene isomers.

The aldehyde employed in the first condensation step of the present process, to introduce an alkyl group other than methyl into the xylene nucleus, has from two to four carbon atoms per molecule. Suitable aldehydes are, therefore, acetaldehyde, propionaldehyde and butyraldehyde. These aldehydes may be employed in the form of the monomer or in polymeric form, e. g. as paraldehyde or other polymeric aldehydes.

The condensation step in which the xylene is reacted with one of said aldehydes is carried out in the presence of a liquid acid catalyst and preferably of liquid sulfuric acid. Suitable sulfuric acid has a concentration of at least about 85 percent by weight $H_2SO_4$, the remainder being water or, in part, a suitable modifying agent such as methyl alcohol. It is preferred to employ liquid acid containing from 85 to 97% by weight $H_2SO_4$, from zero to 10% by weight methanol and from zero to 15% $H_2O$. In the absence of methanol or similar modifier, the preferred sulfuric acid concentration is between 89 and 95%. The condensation reaction is carried out at a temperature no higher than about 0° C. and preferably in the range between —5° and —20° C., in order to suppress undesired side reactions and particularly loss of aromatics by sulfonation.

The reaction may be carried out by adding the catalyst and the reactants to the reaction vessel, maintaining the vessel at the desired temperature and agitating from ten to thirty minutes. Alternatively, the catalyst may be placed in the reaction vessel and the reactants gradually added over a period of time or the reaction may be carried out in continuous manner with addition of reactants and withdrawal of reaction product.

After completion of the reaction the hydrocarbon phase is withdrawn. It consists predominantly of the diarylalkane corresponding to the xylene and aldehyde employed as charge stock. Some triaryldialkane and a little heavier product e. g., tetraaryltrialkane may also be formed. The hydrocarbon phase removed usually contains unconverted xylene charge stock. It may be fractionally distilled to recover a fraction free of unconverted charge and, if desired, a fraction consisting essentially of the diarylalkane.

The condensation product from the first reaction is then subjected to a hydrocracking step. If desired, the total condensation product or the total product of the first reaction including unconverted xylenes may be charged to the hydrocracking step. Alternatively, the diarylalkane fraction may be charged separately and the triaryldialkane and heavier also charged separately.

The hydrocracking reaction is carried out by passing the hydrocarbon fraction to be converted, in admixture with a substantial proportion of hydrogen, at an elevated temperature and pressure into contact with a catalyst active for cleaving the linkage between the aryl carbon and the bridging alkylene carbon atom. In general, the high melting compounds of group VI–VIII metals of the periodic table having an atomic number of at least twenty-four are suitable, particularly the variable valence metals and more particularly combinations of at least two of them. The dehydrogenating metal sulfides are a preferred class of catalysts for the process, particularly the group VI metal sulfides as for example the sulfides of tungsten, molybdenum and chromium and the sulfides of metals of atomic numbers from 25 to 28. Composites of a metal sulfide from each of these groups are especially preferred. Corresponding oxides and composites thereof are also suitable catalysts for the present purpose as well as composites of oxides and sulfides. A particularly suitable catalyst is, for example, a tungsten-nickel-sulfide catalyst such as is utilized commercially for the dehydrogenation of methylcyclohexane to toluene. Mixed sulfides of molybdenum and tungsten, per se or supported on a porous base such as activated alumina, comprise another preferred catalyst.

The catalytic hydrocracking of the condensation products is readily effected by passing them in vapor phase admixed with a substantial amount of free hydrogen over a mass of catalyst particles of the type described while maintaining the reaction zone at a suitable elevated temperature, the pressure at a suitable level and the proportion of hydrogen at a suitable high value.

Temperatures in the hydrocracking step may range from about 300° C. to about 500° C., with temperatures between 350° C. and 450° C. being preferred. The pressure employed is preferably in the range between 300 and 700 pounds per square inch gauge, but may be as low as 100 and as high as 1000 p. s. i. g. To suppress the formation of benzene having an unsaturated side chain, the mole ratio of hydrogen to hydrocarbon should be at least 2:1 and is preferably in the range between 4:1 and 8:1 although ratios as high as 10:1 and higher may be suitably employed. The time of contact between hydrocarbon and catalyst is in the range between about 1 and 40 seconds, times between 5 and 15 seconds being preferred.

The hydrocracking catalyst may become contaminated with carbonaceous matter during the hydrocracking step and may be periodically regenerated by burning with free oxygen-containing gas in the manner well known to the art. Since the rate at which carbonaceous matter is deposited may be somewhat higher with the high condensation products i. e., triaryldialkane and higher, than with the diarylalkane it may be desirable to charge the respective fractions separately, employing different catalysts, or different conditions for the separate fractions, e. g., a higher hydrogen ratio may be employed with the higher condensation products to further suppress formation of carbonaceous deposits.

The hydrocarbon products recovered from the hydrocracking step comprise xylene, regenerated from the condensation product, and alkylxylenes. The type of alkylxylenes recovered depends on the xylene and the aldehyde originally charged to the condensation step. Thus, the main product recovered from the condensation of meta-xylene and acetaldehyde is 4-ethyl-1,3-dimethylbenzene; from the conversion of ortho-xylene and propionaldehyde, it is 4-n-propyl-1,2-dimethylbenzene; and from the conversion of para-xylene and butyraldehyde, it is 2-n-butyl-1,4-dimethylbenzene.

The hydrocarbon product from the hydrocracking step is fractionated into a xylene fraction, which may be returned to the condensation step, and an alkylxylene product cut.

The alkylxylene product from the hydrocracking step is contacted with formaldehyde in a second condensation step to produce the corresponding diarylmethane and in some cases, higher alkylation products such as triaryldimethane. This condensation may suitably be carried out with a liquid acid catalyst and preferably sulfuric acid. Suitable sulfuric acid has a concentration of from 60 to 85% by weight $H_2SO_4$, the remainder being water or, in part, a suitable modifying agent such as methanol. A suitable catalyst is liquid acid containing from 60 to 85% wt. $H_2SO_4$, from 0 to 30% wt. methanol and from 15 to 40% wt. $H_2O$. A particularly preferred acid contains about 60% wt. $H_2SO_4$, 30% wt. methanol and 10% water. In the absence of methanol, about 70% wt. $H_2SO_4$ is preferred. The aromatic-formaldehyde condensation with liquid acid is carried out at temperatures between 60° and 150° C., and preferably between about 60° and 100° C. In a practical modification of the process, relatively strong sulfuric acid is employed in the first condensation step to condense xylene with a higher aldehyde at the lower temperature used therefor and after the acid has lost strength it is then employed in the formaldehyde condensation step at the higher temperature therefor.

The formaldehyde condensation step is also suitably carried out in the presence of solid acidic catalysts at higher temperatures. Solid catalysts suitable for use are solids of substantial porosity and acidity, employed in finely divided form. A particularly suitable catalyst consists of silica gel containing adsorbed thereon sulfuric acid in an amount ranging between 0.1 and 15% by weight, based on the support, a preferred concentration of sulfuric acid being 0.4 to 2.5% by weight. Other mineral acids such as phosphoric acid and phosphotungstic acid supported on silica gel in similar concentrations may also be employed. Another suitable catalyst is a calcined composite of silica gel containing a small amount of alumina in the range between 0.1 and 5% by weight and preferably between 0.5 and 4% by weight, although catalysts with higher alumina content may also be employed provided they are calcined by heating at a temperature between 400° and 700° C. for from 2 to 48 hours, the shorter times being used at the higher temperatures.

In general, the solid acidic catalysts which may be employed have in common a relatively high surface area and porosity, a pronounced amount of acidity, and a substantial absence of acid sites having an acid strength as great as that of concentrated liquid sulfuric acid. The solid catalysts may become contaminated by carbonaceous deposits during the course of the condensation reaction and they are readily regenerated by conventional oxidative regeneration e. g., by burning the catalyst with a gas containing a controlled amount of free oxygen, such as air. If part or all of the mineral acid is lost from the silica gel during regeneration it is replaced before reuse of the catalyst.

In the preferred method of operation with solid catalyst, an agitated slurry of catalyst particles, suspended in a liquid body comprising aromatic hydrocarbon charge stock and, generally, some product, is maintained in a heated reaction zone at a temperature which permits removal of all water added to and formed in the reaction zone in the form of a vapor stream comprising the water and some of the hydrocarbon. Formaldehyde is added to the reaction zone either as anhydrous formaldehyde or as aqueous formaldehyde containing from 5 to 60% HCHO e. g., 37% formalin. Any water which is added with the formaldehyde, together with the water formed in the reaction, is immediately removed by withdrawing a vapor stream of water and aromatic. The vapors withdrawn from the reaction zone are condensed and the aromatic hydrocarbon is suitably returned to the reaction zone.

The reaction can be carried out in a batchwise operation by charging a desired amount of the aromatic hydrocarbon to the reaction zone together with the required amount of catalyst and gradually adding sufficient formaldehyde to produce the desired amount of the condensation product. In the continuous method of operation a body of liquid comprising catalyst slurry in aromatic charge hydrocarbon and product is maintained in the reaction zone, fresh aromatic hydrocarbon charge and formaldehyde are continuously added, and a bleed stream of the liquid is continuously withdrawn for recovery of product therefrom and return of unconverted charge hydrocarbon to the reaction zone.

In the operation with solid acidic catalysts, temperatures in the range between 100° and 200° C. are preferred, though temperatures up to 250° C. may be employed. Atmospheric pressure is preferably employed although higher pressures may be used, especially with a relatively low boiling hydrocarbon. With the preferred hydrocarbon feedstocks and catalysts the condensation reaction is very nearly instantaneous, being ordinarily substantially complete within two to five seconds after the addition of an increment of monomeric formaldehyde. The rate of addition of formaldehyde is controlled such that no more formaldehyde is added to the reaction mixture at any time than can be completely converted to condensation product within the time of less than one minute, preferably less than 30 seconds and most preferably less than 5 seconds. The ratio of feed aromatic hydrocarbon to unreacted formaldehyde monomer in the reaction slurry is, therefore, very high, e. g., from 30 to 2000 moles of aromatic per mole of formaldehyde.

The liquid hydrocarbon phase recovered from the condensation with formaldehyde contains unconverted alkylxylene and condensation products consisting predominantly of dialkylxylylmethane and some trialkylxylyl dimethane and perhaps heavier condensation products. At least the dialkylxylylmethane is subsequently charged to another hydrocracking step. As has been described above, the total hydrocarbon effluent from the condensation may be charged to the hydrocracking step or the effluent may be fractionally distilled to segregate the alkylxylene fraction for return to the condensation zone and to segregate either a total condensation product consisting of diarylmethane and heavier or to recover separately the diarylmethane fraction and the heavier condensation product for charging to the hydrocracking step.

The product from the formaldehyde condensation step is charged to a second hydrocracking step, which is carried out with the catalysts and under the conditions described above. The product from the second hydrocracking step consists of reconstituted alkylxylenes and of alkyltrimethylbenzenes. The alkyltrimethylbenzenes recovered consist to the extent of 80 to 90% or more of 5-alkyl-1,2,4-trimethylbenzene, the desired product of the present invention.

The 5-alkyl-1,2,4-trimethylbenzene may be further purified and concentrated by fractional distillation to recover a product having from 95 to 100% of a desired isomer.

The 5-alkyl-1,2,4-trimethylbenzene is characterized by the fact that the alkyl groups are distributed in a symmetrical manner in the nucleus, the positions filled being the same which are filled by methyl groups in durene (1,2,4,5-tetramethylbenzene). By virtue of the fact that one of the four groups is an ethyl, propyl or butyl group, however, rather than another methyl, the compound produced in accordance with the present process is a liquid at ordinary temperatures rather than a solid, as is durene, and is therefore more easily handled in a variety of further chemical processing steps.

The 5-alkyl-1,2,4-trimethylbenzenes are suitable for use as solvents and heat transfer fluids. They also are suitable for further conversion into a variety of useful compounds, e. g. they may be interpolymerized with bis-chloromethyl durene to produce a polymer superior to that produced from durene.

The present invention will be further illustrated by means of the following examples, which are not to be considered in limitation thereof.

*Example I.*—A xylene mixture consisting of 63% meta-xylene, 4% ortho-xylene, 29% para-xylene, and 4% ethylbenzene was reacted with paraldehyde (acetaldehyde trimer). This reaction was carried out by contacting 4388 parts by weight of xylene mixture with 586 parts by weight of the aldehyde in the presence of 3000 parts by weight of 96% sulfuric acid. The acid was placed in a reaction vessel together with 80% of the xylenes cut. The remainder of the xylenes cut was admixed with the aldehyde and the mixture gradually added to the reaction vessel. The temperature was maintained between —4° and —16° C., being in the lower part of the range during most of the run. The mixture was agitated for a period of about one and three-quarter hours. From an analysis of the products of the condensation it was found that over 98% of the aldehyde had been converted to useful product while 52% of the xylenes had been converted to useful product and 5% of the xylenes had been converted to sulfonated material or otherwise lost in the acid phase. The condensation product consisted 81% of dixylyl ethane, 14% of trixylyl diethane, and 5% of heavier material. Apparently the meta-xylene was converted to condensation product preferentially in the alkylation and little of the other xylene isomers was converted.

The hydrocarbon phase from the above alkylation was subjected to a rough distillation to recover a cut consisting of essentially all the condensation product and still containing some unconverted xylenes. This cut was then contacted at a temperature of 400° C., a hydrogen pressure of 500 lbs./sq. in. and a liquid hourly space velocity of 4.4 v./v./hr. with a molybdenum-tungsten-sulfide catalyst consisting of 7.7% by wt. molybdenum and 7.7% by wt. tungsten, both in the form of their sulfides, supported on activated alumina. About 95% of the condensation product was converted to alkyl benzenes. The xylenes fraction recovered consisted essentially of metaxylene, suitable for further conversion in the condensation step. The $C_{10}$-fraction apparently contained over 90% of 4-ethyl-1,3-dimethylbenzene, the remainder being substantially only 2-ethyl-1,4-dimethylbenzene. The former compound results from the condensation of acetaldehyde with meta-xylene while the latter results from condensation with paraxylene. 5-ethyl-1,3-dimethylbenzene was not identified in the product and could not have been present to the extent of more than about 5%. The latter compound would also result from the condensation of metaxylene with acetaldehyde.

A portion of the total ethylxylene product recovered from the hydrocracking step was subjected to condensation with formaldehyde in a second condensation step. This condensation was carried out in the presence of a finely divided solid acidic catalyst consisting of about 1% of sulfuric acid supported on a high surface area silica gel. The reaction was carried out in the manner described in the body of the specification, above, by admixing 190 parts by weight of the catalyst with the 1147 parts by weight of dimethylethylbenzene to be reacted, agitating the mixture to form a slurry and maintaining it at a temperature of 165 to 170° C., gradually adding 80 parts by weight of formaldehyde in the form of 37% aqueous formalin (215 parts by weight of formalin) withdrawing water vapor and some aromatic from the reaction zone continuously and returning the condensed aromatic while separating the condensed water layer. The reaction was carried out over a period of one and one-quarter hours. The resulting hydrocarbon layer was separated and fractionally distilled to recover the condensation product as a separate cut. The condensation product was then hydrocracked over the same catalyst as described above, at a space velocity of 4.4 v./v./hr., a temperature of 400° C., and a pressure of 500 p. s. i. g. About 96% of the condensation product was recovered in a form of ethyltrimethylbenzene which appeared to contain 94% of 5-ethyl-1,2,4-trimethylbenzene, the remainder being mostly tetralkylbenzene having a 1,2,3,5 structure. Although the concentration of 5-ethyl-1,2,4-trimethylbenzene may have been somewhat less than 94% it is certain that it was at least 88% of the $C_{11}$-cut produced in the hydrocracking step.

We claim as our invention:

1. Process for producing 5-alkyl-1,2,4-trimethylbenzene which comprises condensing xylene with an alkanal of 2 to 4 carbon atoms per oxygen atom in the presence of a liquid acid catalyst, recovering a condensation product, hydrocracking at least the diaryl-alkane fraction thereof at an elevated temperature of from about 300° to about 500° C. and a pressure in the range between 100 and 1000 p. s. i. g. in the presence of at least two moles of hydrogen per mole of hydrocarbon and of a high melting, essentially neutral substance having hydrogenation activity, contacting the resulting alkyldimethylbenzene with formaldehyde under condensation conditions to produce a condensation product, hydrocracking at least the resulting diarylmethane fraction thereof at an elevated temperature in the presence of hydrogen and of a high melting essentially neutral substance having hydrogenation activity, and recovering 5-alkyl-1,2,4-trimethylbenzene from the hydrocracking product.

2. Process according to claim 1 in which said xylene is meta-xylene.

3. Process according to claim 1 in which said xylene is para-xylene.

4. Process according to claim 1 in which said liquid acid is sulfuric acid having from 85 to 97% $H_2SO_4$, from 0 to 10% methanol and from 0 to 15% $H_2O$.

5. Process according to claim 1 in which said second condensation step is carried out in the presence of a solid finely divided acidic catalyst.

6. Process according to claim 1 in which said alkanal contains two carbon atoms per oxygen atom and said 5-alkyl-1,2,4-trimethylbenzene is 5-ethyl-1,2,4-trimethylbenzene.

7. Process for producing 5-alkyl-1,2,4-trimethylbenzene which comprises condensing xylene with an aldehyde having from 2 to 4 carbon atoms per oxygen atom at a temperature no higher than about 0° C. in the presence of liquid sulfuric acid catalyst, recovering a condensation product, hydrocracking at least the diarylalkane fraction thereof at a temperature in the range between 300° and 500° C. and a pressure in the range between 100 and 1000 p. s. i. g. in the presence of at least four moles of hydrogen per mole of hydrocarbon and of a high melting inorganic compound selected from the group consisting of oxides, sulfides and composites thereof of group VI to VIII metals having atomic numbers of at least 24, contacting the resulting alkyldimethylbenzene with formaldehyde under condensation conditions to produce a condensation product, hydrocracking at least the diarylmethane fraction thereof at a temperature in the range between 300° and 500° C. and a pressure in the range between 100 and 1000 p. s. i. g. in the presence of at least two moles of hydrogen per mole of hydrocarbon and of a high melting inorganic compound selected from the group consisting of oxides, sulfides and composites thereof of group VI to VIII metals having atomic numbers of at least 24, and recovering 5-alkyl-1,2,4-trimethylbenzene from the hydrocracked product.

References Cited in the file of this patent

UNITED STATES PATENTS

| | | |
|---|---|---|
| 2,422,169 | May et al. | June 10, 1947 |
| 2,500,369 | McCoubrey et al. | Mar. 14, 1950 |
| 2,761,885 | De Jong et al. | Sept. 4, 1956 |